(12) United States Patent
Mertz et al.

(10) Patent No.: US 6,846,342 B2
(45) Date of Patent: Jan. 25, 2005

(54) FILTER PACK HAVING NONWOVEN FILTER MEDIA AND NONWOVEN EDGE BANDING FRAME

(75) Inventors: Kent Mertz, Clarksville, TN (US); Markus Schmitt, deceased, late of Clarksville, TN (US); by Beatrix Yvonne Schmitt, legal representative, Clarksville, TN (US)

(73) Assignee: Freudenberg Nonwovens Limited Partnership, Durham, NC (US)

( * ) Notice: Subject to any disclaimer, the term of this patent is extended or adjusted under 35 U.S.C. 154(b) by 0 days.

(21) Appl. No.: 10/622,013

(22) Filed: Jul. 17, 2003

(65) Prior Publication Data

US 2004/0065066 A1 Apr. 8, 2004

Related U.S. Application Data

(60) Provisional application No. 60/396,664, filed on Jul. 18, 2002.

(51) Int. Cl.$^7$ ............................ B01D 46/10; B01D 46/52
(52) U.S. Cl. ............................ 55/486; 55/484; 55/487; 55/502; 55/511; 55/521; 55/528; 55/DIG. 31
(58) Field of Search .......................... 55/482, 484, 486, 55/487, 502, 511, 521, 528, DIG. 31

(56) References Cited

U.S. PATENT DOCUMENTS

| | | | | |
|---|---|---|---|---|
| 4,518,402 A | * | 5/1985 | Dargel | 55/DIG. 31 |
| 5,167,740 A | | 12/1992 | Michaelis et al. | 156/73.1 |
| 5,224,974 A | * | 7/1993 | Johnson | 55/486 |
| 5,603,747 A | * | 2/1997 | Matuda et al. | 55/511 |
| 5,709,735 A | | 1/1998 | Midkiff et al. | 96/17 |
| 5,779,747 A | * | 7/1998 | Schlor et al. | 55/521 |
| 5,792,228 A | * | 8/1998 | Fath et al. | 55/521 |
| 6,027,553 A | * | 2/2000 | Hirano et al. | 55/502 |
| 6,164,457 A | | 12/2000 | Schlor | 210/455 |
| 6,179,891 B1 | | 1/2001 | Knudsen et al. | 55/502 |
| 6,464,745 B2 | | 10/2002 | Rivera et al. | 55/497 |
| 6,488,731 B2 | | 12/2002 | Schultheiss et al. | 55/486 |

* cited by examiner

Primary Examiner—Duane Smith
Assistant Examiner—Jason M. Greene
(74) Attorney, Agent, or Firm—Weingarten, Schurgin, Gagnebin & Lebovici LLP

(57) ABSTRACT

A filter pack is formed of a pleated filter section and a top edge band and a bottom edge band that form a frame. The filter section and the frame are formed of a nonwoven polymer material, preferably a polyester material. The filter section is retained in the frame by an adhesive, preferably also a polyester material. The filter pack provides more filtration media per area, leading to more efficient filtration. The filter pack is fully shreddable and does not require separation into various components for recycling.

41 Claims, 6 Drawing Sheets

FILTER PACK HAVING NONWOVEN FILTER MEDIA AND NONWOVEN EDGE BANDING FRAME

CROSS REFERENCE TO RELATED APPLICATIONS

This application claims the benefit under 35 U.S.C. §119 (e) of U.S. Provisional Patent Application No. 60/396,664, filed on Jul. 18, 2002, the disclosure of which is incorporated by reference herein.

STATEMENT REGARDING FEDERALLY SPONSORED RESEARCH OR DEVELOPMENT

N/A

BACKGROUND OF THE INVENTION

Air filters for prefiltration and final filtration for HVAC and general equipment protection can take many forms, depending on the particular application. One type of filter is a pleated filter, which is formed from a sheet of filter media folded into a series of pleats. One type of pleated filter, known as a minipleat filter, has smaller, closely spaced pleats. The peaks between adjacent pleats of a minipleat filter are spaced no more than 20 mm apart and typically range from 5.0 mm to 7.5 mm apart.

A pleated filter can be made from a variety of media. The size of the filter affects the choice of media. For example, for a minipleat filter, fiberglass is a suitable material. A synthetic, nonwoven filter media has been used, as described in U.S. Pat. No. 6,464,745.

Typically, minipleat or other pleated filter media are disposed within a hard or rigid plastic frame. The rigid frame is then mounted within the filtration equipment. The frame maintains the pleated filter media in the desired configuration and size and imparts some structural rigidity to the entire assembly.

SUMMARY OF THE INVENTION

The present invention provides an all-nonwoven filter pack that provides more filtration media per area than prior art filters that use hard plastic frames. In particular, the present filter pack has sections of pleated filter media held in place by strips of edge banding shaped into a frame. The filter media and the edge banding are formed from a synthetic nonwoven material, preferably the same polymer. A number of filter packs can be joined together into a filter assembly.

The filter pack provides more filtration media per area, leading to more efficient filtration. The filter pack is also able to conform to irregularities in the equipment in which it is mounted, minimizing leakage. The filter pack can be readily shredded for disposal, because it has no hard plastic frame members. By forming the filter media and the edge banding from the same polymer material, no separation into different classes of recyclable materials is required prior to disposal. The filter pack is light-weight and suitable for use in various air filtration applications.

DESCRIPTION OF THE DRAWINGS

The invention will be more fully understood from the following detailed description taken in conjunction with the accompanying drawings in which.

DETAILED DESCRIPTION OF THE INVENTION

Figure 1:
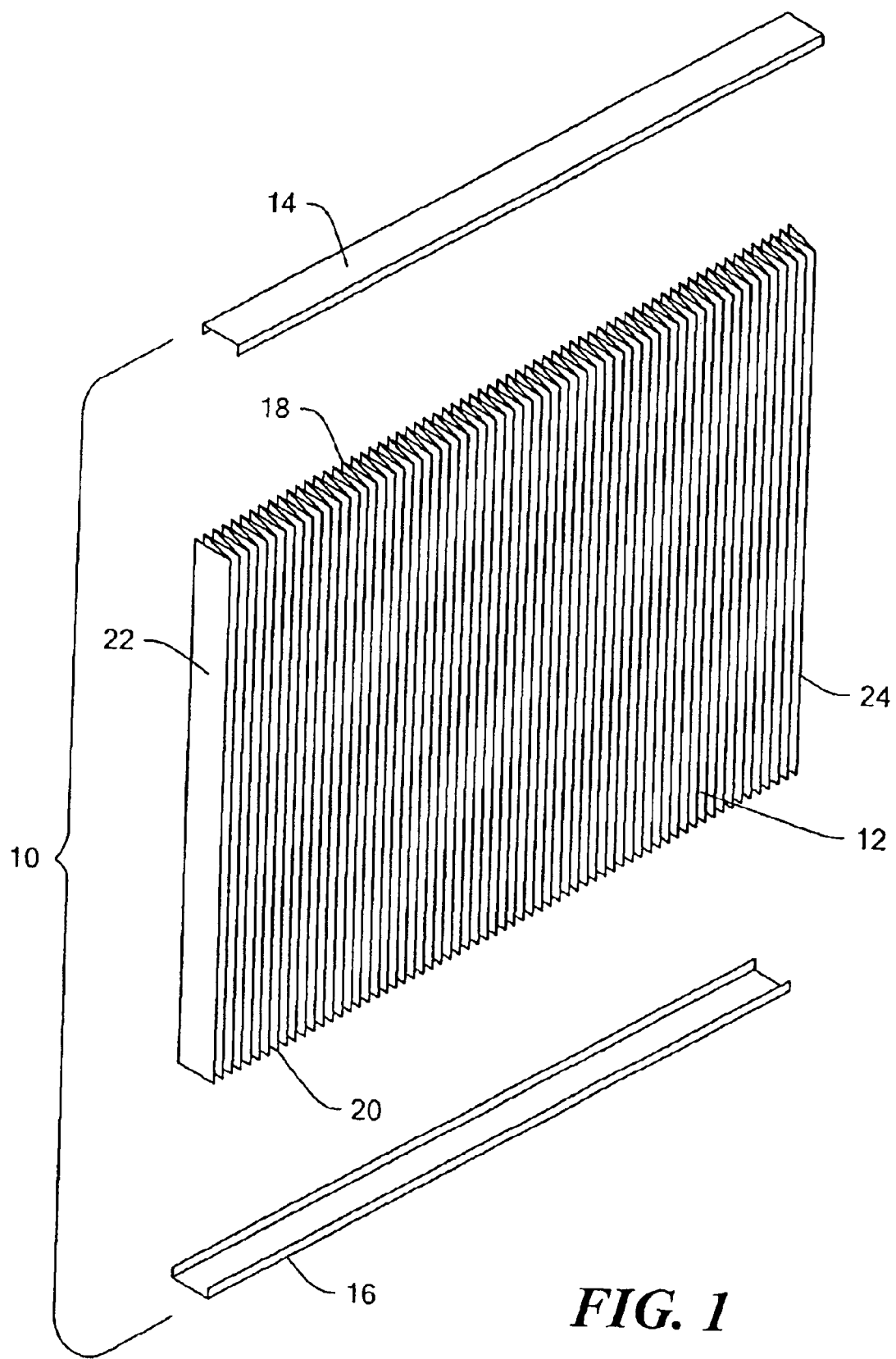
FIG. 1 is an isometric exploded view of an all-nonwoven filter pack according to the present invention.
Figure 2:
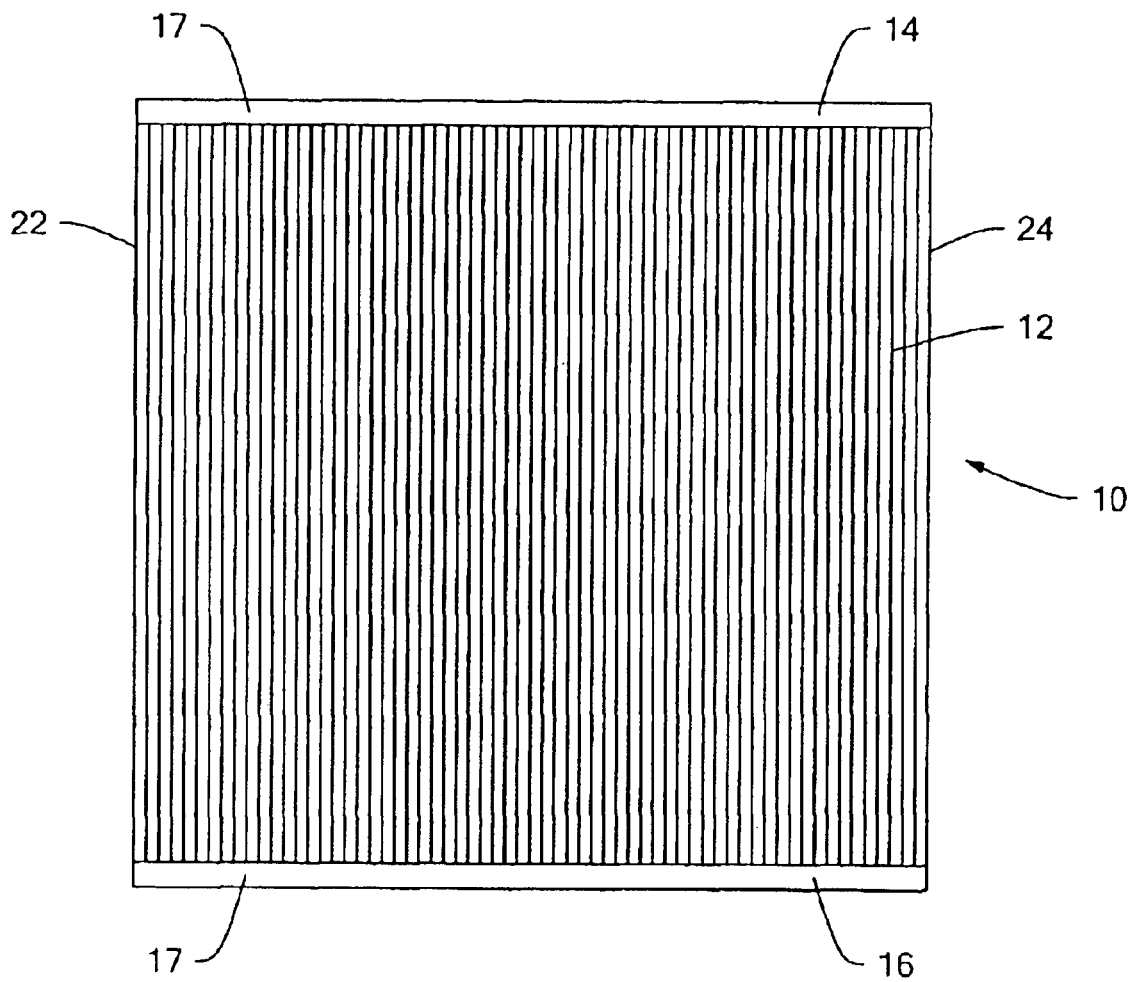
FIG. 2 is a front view of the filter pack of FIG. 1.

Referring to FIGS. 1 and 2, a filter pack 10 according to the present invention has a section 12 of pleated filter media held in place by strips of edge banding 14, 16 that form a frame 17. Both the filter media pleated section and the edge banding frame are formed from a synthetic nonwoven material. Preferably, both the pleated section and the edge banding frame are formed from the same polymer. A polyester is suitable, although other polymers may be used.

Figure 3:
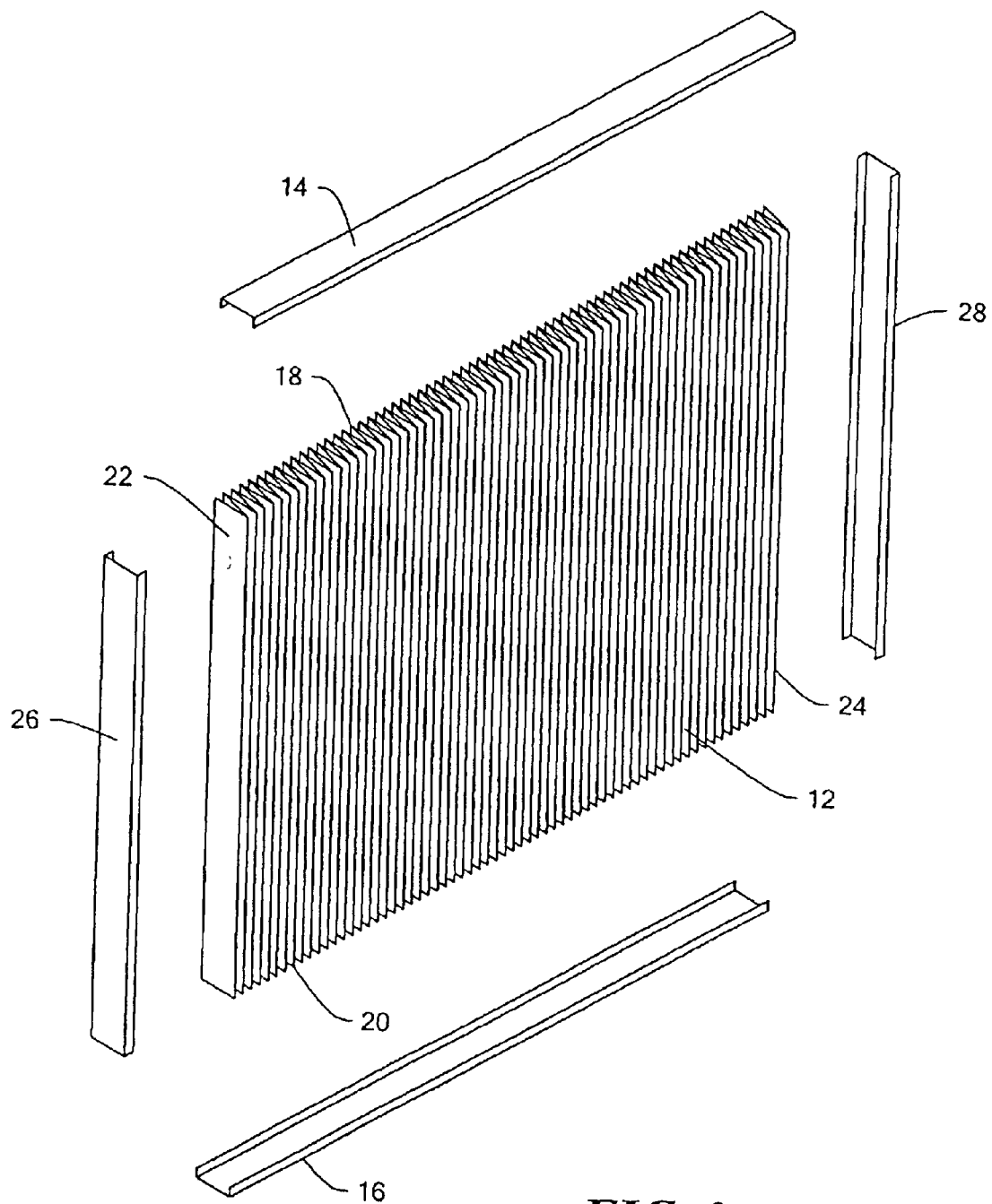
FIG. 3 is an isometric exploded view of a further embodiment of an all-nonwoven filter pack according to the present invention.
Figure 4:
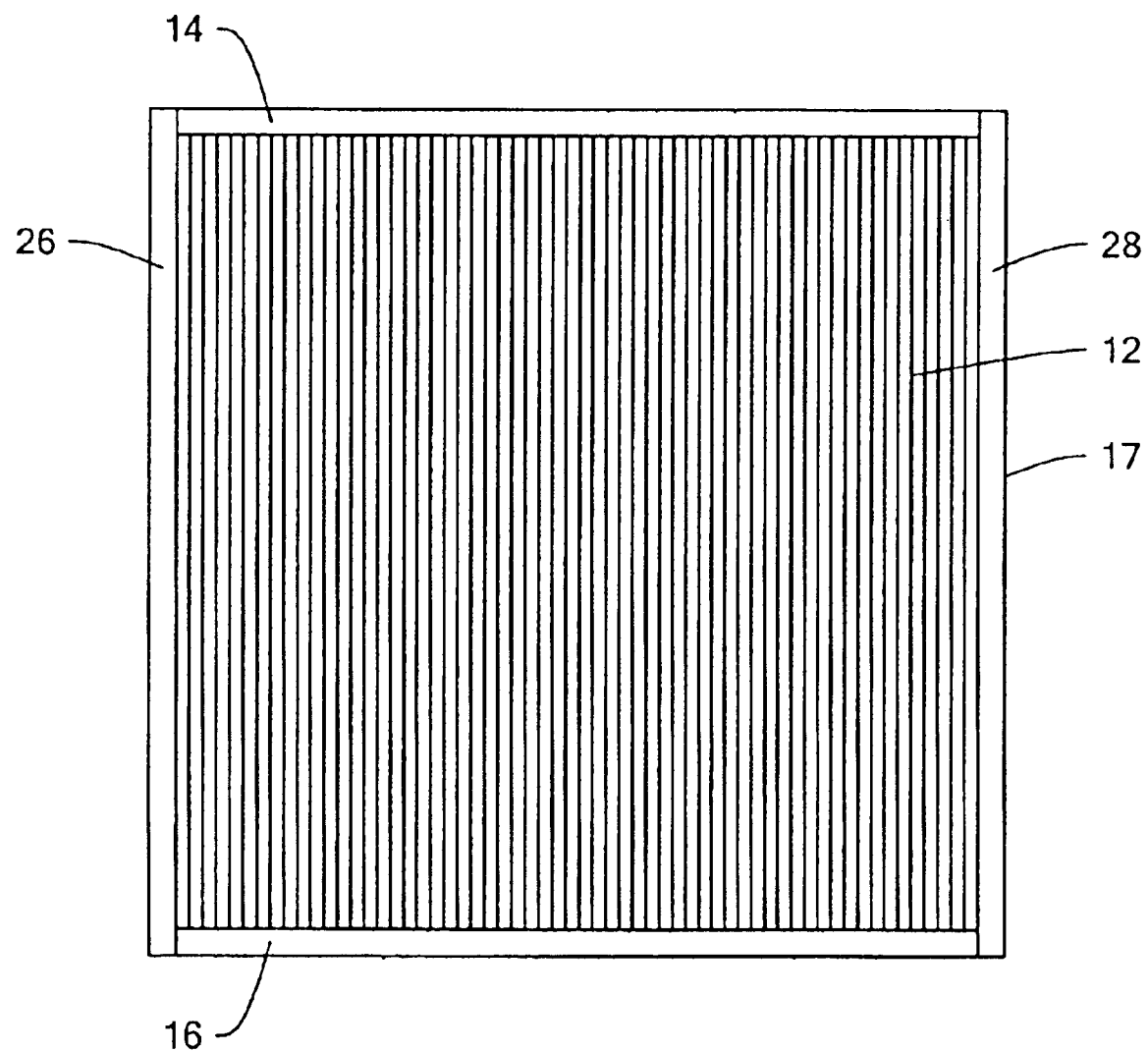
FIG. 4 is a front view of the filter pack of FIG. 3.

Each section 12 of the filter media comprises a sheet of a nonwoven material that has been pleated or folded in an accordion fashion. A minipleat section can be suitably used in the present invention. Each pleated section is held in the pleated configuration by the strips of edge banding 14, 16 extending along the two sides 18, 20 transverse to the pleats. The remaining two sides 22, 24, parallel to the pleats, may be left free of edge banding. Each edge banding strip has a channel or C-shaped cross-sectional form. The sides 18, 20 of the pleated section 12 are placed within the channel and held there in any suitable manner, such as with an adhesive. Once assembled, the pleated filter section 12 and edge banding frame 17 form a filter pack 10. If desired, edge banding strips 26, 28 may be provided along the other two sides of the pleated filter section as well, as illustrated in FIGS. 3 and 4.

The adhesive should be capable of forming a solid bond with the pleated filter section 12 and the edge banding frame 17 and should be compatible with the material of the pleated filter section and the edge banding frame. A hot-melt adhesive is suitable and is preferably of the same polymer as the pleated filter section 12 and the edge banding frame 17. A polyester hot-melt adhesive is suitable when the filter section and edge banding frame are formed from a polyester material.

Figure 5:
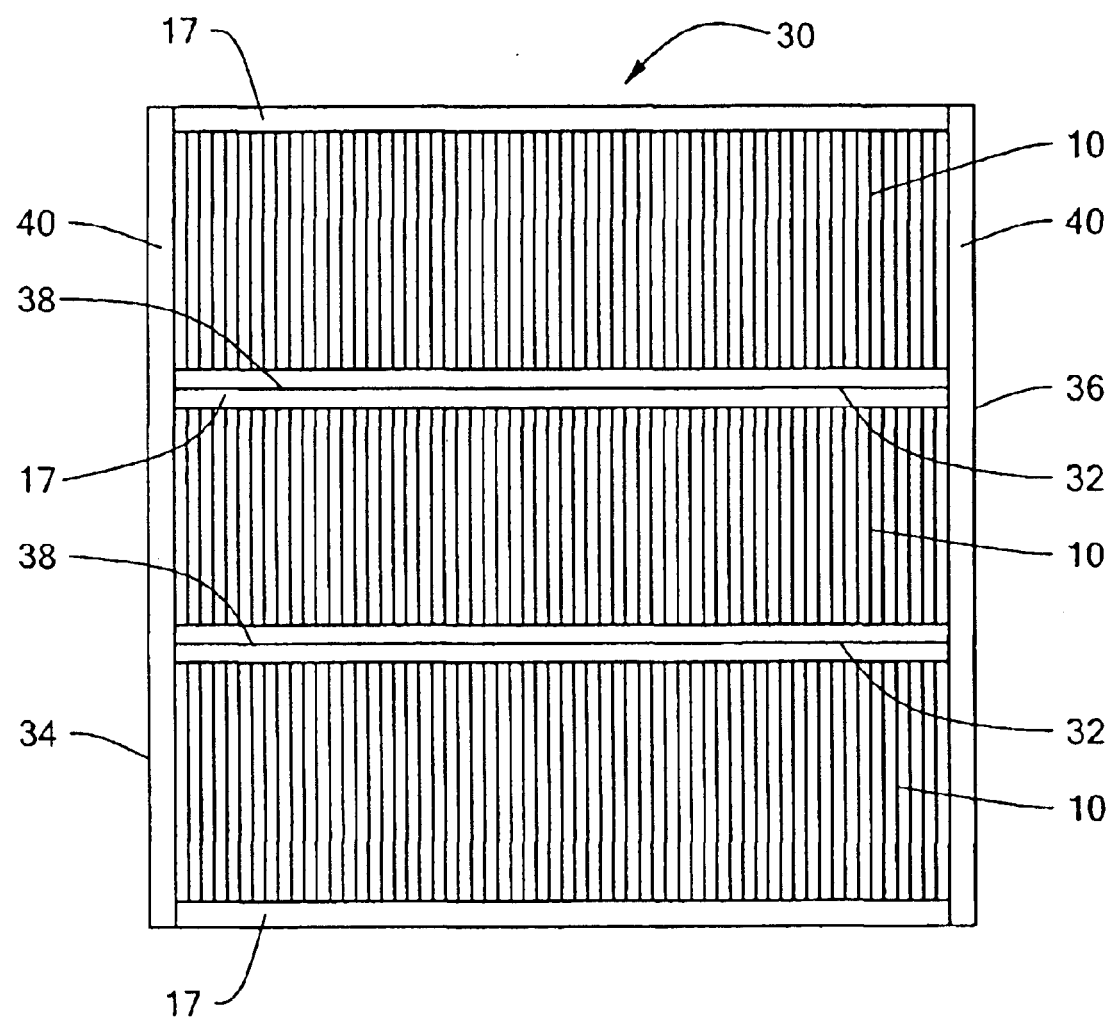
FIG. 5 is a front view of an assembly of filter packs according to FIG. 1.

A number of filter packs 10 may be attached together to form a filter assembly 30. Referring to FIG. 5, three filter packs arranged in a filter assembly are illustrated, although any suitable number and configuration of filter packs may be used, depending on the application. An adhesive, such as a hot-melt adhesive, is applied along abutting faces 32 of the edge banding frames 17 to hold adjacent filter packs together. Strips of edge banding 34, 36 are then placed along at least the two sides having joints 38 between filter packs to protect these joints and form an outer frame 40 that gives further structural rigidity to the assembly. The edge strips are similarly held in place by a suitable adhesive.

Figure 6A:
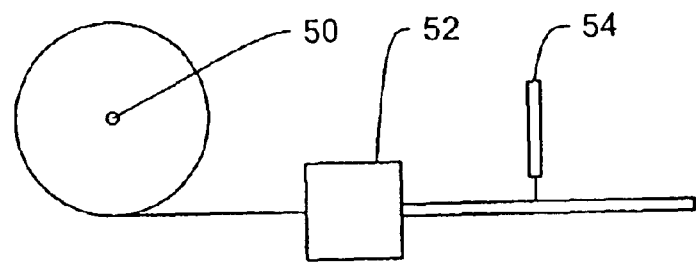
FIGS. 6A, 6B, and 6C are schematic illustrations of a manufacturing process for the filter pack of FIG. 1.
Figure 6B:
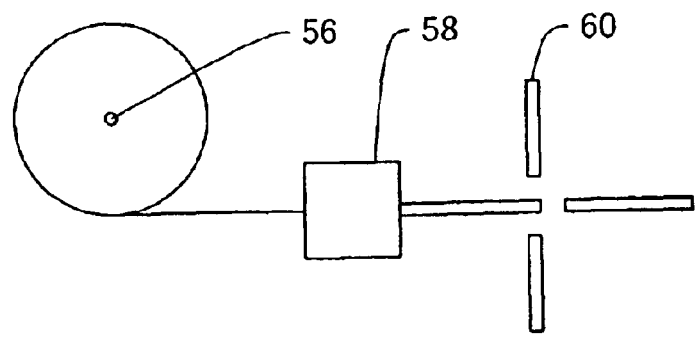
Figure 6C:
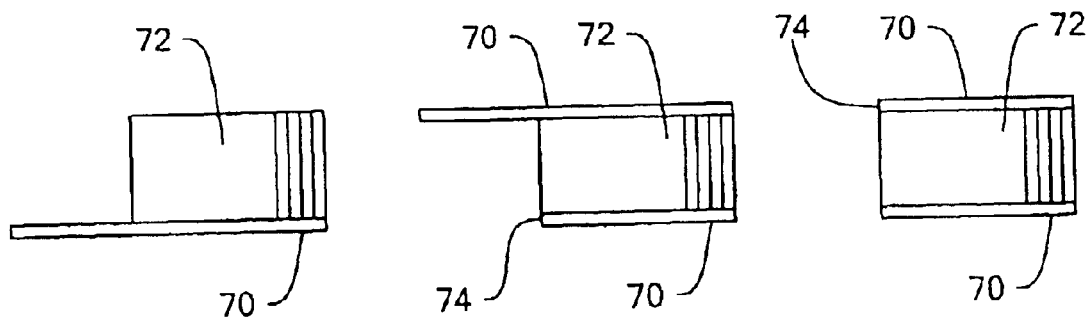

The filter pack may be manufactured in any suitable manner. Referring to FIG. 6A, the edge banding material is typically supplied in a roll 50. A length of the edge banding material is unrolled, scored along two longitudinal lines, and bent along the score lines to form the sides of the channel at suitable scoring and folding machinery 52, known in the art. A hot melt adhesive is deposited within the channel by suitable equipment 54. Concurrently, the filter section material, which is also typically supplied in a roll 56, is unrolled and pleated at suitable pleating machinery 58, known in the art. See FIG. 6B. The pleated material is cut transversely to the pleats to form filter sections of the appropriate size at suitable cutting equipment 60. Referring to FIG. 6C, the edge banding strip 70 is adhesively attached to the desired sides of the pleated filter sections 72 and cut at the ends 74 of the side so that the strip is as long as the corresponding side of the pleated filter section. Alternatively, the strip may be cut to an appropriate length first and then adhesively applied to the filter section. If the strips of edge banding extend beyond the sides of the filter sections, they may be trimmed off. Similarly, for the outer frame of an assembly of multiple filter packs, a length of the edge banding material is unrolled, scored and folded, and cut to an appropriate length. The strip is adhesively attached to the appropriate side of the assembly of filter packs. The edge banding strips may overlap at the corners if all four sides are covered with edge banding.

The particular material selected for the filter section and the edge banding frame depends on the application and on manufacturing considerations. Different applications may have different filtration requirements. Also, different nonwoven polymer media have different properties, such as elongation and strength, which may render them unsuitable for use with different types of manufacturing equipment. For example, they may not pleat well or thread properly through the equipment.

In one preferred embodiment, which has been found to be readily manufacturable and suitable for a variety of air filtration applications, the pleated filter section is formed from a laminate of a melt blown microfiber polyester inner layer and spun bond polyester outer layers, and the edge banding frame is formed from a spun bond polyester. The melt blown microfiber polyester material for the inner layer of the pleated filter section has a smaller fiber and is thicker than the spun bond polyester and provides greater filtration efficiency. The spun bond polyester material for the outer layer is stiffer and enables the filter section to retain its pleated form. In the described preferred embodiment, the weight of the melt blown polyester material may range up to 50 g/m$^2$. A weight greater than this results in a thicker inner layer, which typically does not laminate as well to the outer layers. Any suitable lamination process, such as an ultrasonic welding process, may be used to form the filter section lamination. The spun bond polyester material is also used for the edge banding frame, because it is a stiffer material, more suitable for a frame. Its weight may be approximately 400 g/m$^2$. The adhesive is a hot melt polyester.

This embodiment has been found to be suitable to form a minipleat filter. To be considered a minipleat filter, the spacing between peaks of adjacent pleats is no greater than 20 mm. In typical minipleat filter applications, the pleat spacing ranges from approximately 5 mm to approximately 7.5 mm. The pleat height also varies depending on the application. In typical applications the pleat height ranges from approximately 36 mm to approximately 92 mm.

The all-nonwoven filter pack and assembly of the present invention provides more filtration media per area, leading to more efficient filtration, and is economical to produce, particularly as its production can be readily automated. The frame is able to conform to small irregularities in the equipment in which it is mounted, leading to less leakage. The filter pack is fully shreddable for disposal and does not have to be separated into components for recycling. The filter pack is more light-weight than prior art filters that require a heavy, stiff or rigid plastic frame. The filter pack is suitable for use in various applications, such as residential forced air systems, turbines, industrial HVAC, and process HVAC.

The invention is not to be limited by what has been particularly shown and described, except as indicated by the appended claims.

What is claimed is:

1. A filter pack comprising:
   a filter section comprising a sheet of filter media comprising a laminate of two or more nonwoven polymer materials, the sheet of filter media having a plurality of parallel folded pleats, the filter section having two opposed longitudinal sides extending parallel to the pleats and two opposed transverse sides extending transversely to the pleats; and
   a frame comprising a top edge band and a bottom edge band, the top edge band and the bottom edge band comprising one of the nonwoven polymer materials, the top edge band and the bottom edge band each having a channel configuration, the top edge band attached to one of the two transverse sides of the filter section, the bottom edge band attached to another of the two transverse sides of the filter section, ends of the pleats of the filter section fixedly retained within the top edge band and the bottom edge band.

2. The filter pack of claim 1, wherein the nonwoven polymer material comprises a polyester.

3. The filter pack of claim 1, wherein the filter section comprises a laminate comprising a melt blown polyester inner layer and spun bond polyester outer layers, and the frame comprises a spun bond polyester.

4. The filter pack of claim 1, wherein the nonwoven polymer material of the filter section includes smaller fibers than the nonwoven polymer material of the frame.

5. The filter pack of claim 1, wherein the nonwoven polymer material of the filter section is thicker than the nonwoven polymer material of the frame.

6. The filter pack of claim 1, wherein the nonwoven polymer material of the filter section includes a material having a greater filtration efficiency than the nonwoven polymer material of the frame.

7. The filter pack of claim 1, wherein the nonwoven polymer material of the frame comprises a material having a greater stiffness than at least one layer of the nonwoven polymer material of the filter section.

8. The filter pack of claim 1, wherein the top edge band and the bottom edge band are attached to the filter section with an adhesive.

9. The filter pack of claim 8, wherein the adhesive comprises a polyester adhesive.

10. The filter pack of claim 8, wherein the adhesive comprises a hot melt polyester adhesive.

11. The filter pack of claim 1, wherein the frame further comprises two side edge bands comprising the nonwoven polymer material, the two side edge bands each having a channel configuration, each of the side edge bands attached to an associated one of the two longitudinal sides of the filter section.

12. The filter pack of claim 1, wherein the pleats of the sheet of filter media have a spacing between adjacent peaks of no greater than 20 mm.

13. The filter pack of claim 1, wherein the pleats of the sheet of filter media have a spacing between adjacent peaks ranging from approximately 5 mm to approximately 7.5 mm.

14. The filter pack of claim 1, wherein the filter section comprises a minipleat filter media.

15. A filter assembly comprising:
  a plurality of filter packs, each filter pack comprising:
    a filter section comprising a sheet of filter media comprising a nonwoven polymer material, the sheet of filter media having a plurality of parallel folded pleats, the filter section having two opposed longitudinal sides extending parallel to the pleats and two opposed transverse sides extending transversely to the pleats, and
    a top edge band and a bottom edge band, the top edge band and the bottom edge band comprising the nonwoven polymer material, the top edge band and the bottom edge band each having a channel configuration, the top edge band attached to one of the two transverse sides of the filter section, the bottom edge band attached to another of the two transverse sides of the filter section, ends of the pleats of the filter section fixedly retained within the top edge band and the bottom edge band;
  the plurality of filter packs fixedly attached together along opposed abutting transverse faces of adjacent top and bottom edge bands, the attached filter packs having a top side, a bottom side, and opposed longitudinal sides; and
  side edge bands having a channel configuration fixedly attached to the plurality of filter packs along the opposed longitudinal sides orthogonal to the top and bottom edge bands, the side edge bands and the outermost top and bottom edge bands forming a frame for the plurality of filter packs, the side edge bands comprising the nonwoven polymer material.

16. The filter assembly of claim 15, wherein the nonwoven polymer material comprises a polyester.

17. The filter assembly of claim 15, wherein the filter sections comprise a laminate comprising a melt blown polyester inner layer and spun bond polyester outer layers, and the top edge bands, the bottom edge bands, and the side edge bands comprise a spun bond polyester.

18. The filter assembly of claim 15, wherein the nonwoven polymer material of the filter sections includes smaller fibers than the nonwoven polymer material of the top edge bands, the bottom edge bands, and the side edge bands.

19. The filter assembly of claim 15, wherein the nonwoven polymer material of the filter sections is thicker than the nonwoven polymer material of the top edge bands, the bottom edge bands, and the side edge bands.

20. The filter assembly of claim 15, wherein the top edge band, the bottom edge band, and the side edge bands are attached to the filter sections with an adhesive.

21. The filter assembly of claim 20, wherein the adhesive comprises a polyester adhesive.

22. The filter assembly of claim 20, wherein the adhesive comprises a hot melt polyester adhesive.

23. The filter assembly of claim 15, wherein the pleats of the sheet of filter media have a spacing between adjacent peaks of no greater than 20 mm.

24. The filter assembly of claim 15, wherein the pleats of the sheet of filter media have a spacing between adjacent peaks ranging from approximately 5 mm to approximately 7.5 mm.

25. The filter assembly of claim 15, wherein the filter section comprises a minipleat filter media.

26. The filter pack of claim 15, wherein the nonwoven polymer material of the filter section includes a material having a greater, filtration efficiency than the nonwoven polymer material of the frame.

27. The filter pack of claim 15, wherein the nonwoven polymer material of the frame comprises a material having a greater stiffness than at least one layer of the nonwoven polymer material of the filter section.

28. A filter pack comprising:
  a filter section comprising a sheet of filter media comprising a nonwoven polymer material, the sheet of filter media having a plurality of parallel folded pleats, the filter section having two opposed longitudinal sides extending parallel to the pleats and two opposed transverse sides extending transversely to the pleats; and
  a frame comprising a top edge band and a bottom edge band, the top edge band and the bottom edge band comprising a nonwoven spun bond polyester material, the top edge band and the bottom edge band each having a channel configuration, the top edge band attached to one of the two transverse sides of the filter section, the bottom edge band attached to another of the two transverse sides of the filter section, ends of the pleats of the filter section fixedly retained within the top edge band and the bottom edge band.

29. The filter pack of claim 28, wherein the nonwoven polymer material comprises a polyester.

30. The filter pack of claim 28, wherein the filter section comprises a laminate comprising a melt blown polyester inner layer and spun bond polyester outer layers.

31. The filter pack of claim 28, wherein the nonwoven polymer material of the filter section includes smaller fibers than the nonwoven polymer material of the frame.

32. The filter pack of claim 28, wherein the nonwoven polymer material of the filter section is thicker than the nonwoven polymer material of the frame.

33. The filter pack of claim 28, wherein the nonwoven polymer material of the filter section includes a material having a greater filtration efficiency than the nonwoven polymer material of the frame.

34. The filter pack of claim 28, wherein the nonwoven polymer material of the frame comprises a material having a greater stiffness than at least one layer of the nonwoven polymer material of the filter section.

35. The filter pack of claim 28, wherein the top edge band and the bottom edge band are attached to the filter section with an adhesive.

36. The filter pack of claim 35, wherein the adhesive comprises a polyester adhesive.

37. The filter pack of claim 35; wherein the adhesive comprises a hot melt polyester adhesive.

38. The filter pack of claim 28, wherein the frame further comprises two side edge bands comprising the nonwoven polymer material, the two side edge bands each having a channel configuration, each of the side edge bands attached to an associated one of the two longitudinal sides of the filter section.

39. The filter pack of claim 28, wherein the pleats of the sheet of filter media have a spacing between adjacent peaks of no greater than 20 mm.

40. The filter pack of claim 28, wherein the pleats of the sheet of filter media have a spacing between adjacent peaks ranging from approximately 5 mm to approximately 7.5 mm.

41. The filter pack of claim 28, wherein the filter section comprises a minipleat filter media.

* * * * *